United States Patent [19]
Kimball

[11] Patent Number: 5,953,322
[45] Date of Patent: Sep. 14, 1999

[54] CELLULAR INTERNET TELEPHONE

[75] Inventor: Robert H. Kimball, San Diego, Calif.

[73] Assignee: Qualcomm Incorporated, San Diego, Calif.

[21] Appl. No.: 08/792,532

[22] Filed: Jan. 31, 1997

[51] Int. Cl.$^6$ .................................................. H04B 7/00
[52] U.S. Cl. .......................................... 370/328; 370/356
[58] Field of Search .................................... 370/310, 328, 370/338, 349, 389, 400, 401, 352, 354, 355, 356; 455/422, 426, 445, 461, 466, 517, 553

[56] References Cited

U.S. PATENT DOCUMENTS

| | | | |
|---|---|---|---|
| 5,502,721 | 3/1996 | Pohjakallio | 370/349 |
| 5,598,412 | 1/1997 | Griffith et al. | 370/352 |
| 5,729,536 | 3/1998 | Doshi et al. | 370/328 |
| 5,793,762 | 8/1998 | Penners et al. | 370/389 |

*Primary Examiner*—Huy D. Vu
*Attorney, Agent, or Firm*—Russell B. Miller; Brian S. Edmonston; Charles D. Brown

[57] ABSTRACT

A cellular telephone that provides the capability of performing Internet telephone calls without the bulk and expense of Internet telephone computer systems. The cellular telephone uses hardware vocoders and communication circuitry already present in the cellular telephone for normal cellular calls to provide the additional Internet telephone functionality.

10 Claims, 6 Drawing Sheets

CELLULAR INTERNET TELEPHONE

BACKGROUND OF THE INVENTION

I. Field of Invention

The present invention pertains to the field of telephones. More particularly, this invention relates to a cellular telephone that includes functionality for performing both cellular telephone calls and Internet telephone calls.

II. Art Background

Computer systems including personal computer systems having suitable hardware and software may be employed for placing telephone calls via a network according to existing Internet communication protocols. Such computer systems typically exchange data packets containing voice information via the Internet.

On the sending side of an Internet telephone call, such a computer system usually generates digital data which represents input speech from a user and then assembles the digital data into data packets that are suitable for Internet transfer. Such digital data representing speech may be generated using a digital sampling and data compression technique or more sophisticated speech representation techniques including software vocoding techniques.

On the receiving side of an Internet telephone call, such computer system typically extracts the digital data representing speech from the received data packets and recovers the speech for rendering to a user. Typically, the recovery of the speech involves a decompression function or an inverse of the vocoder function on the sending side that generated the digital data representing speech.

Such prior Internet telephony systems typically require that users on both ends of an Internet telephone call have a computer system such as a personal computer system. In addition, such computer systems must have specialized Internet telephony software for performing compression/decompression or vocoder functions as well as microphone and speaker peripherals. Unfortunately, such computer systems with specialized hardware and software are usually relatively bulky and usually impose relatively high costs to users.

SUMMARY OF THE INVENTION

A cellular telephone is disclosed that provides the capability of performing Internet telephone calls without the bulk and expense of Internet telephone computer systems. The techniques disclosed herein exploit the hardware vocoders and communication circuitry already present in a cellular telephone to provide the additional Internet telephone functionality. The techniques disclosed herein are readily applicable to existing cellular telephones using primarily software modifications.

A cellular telephone according to the present invention generates a set of digital data representing a voice signal from a user of the cellular telephone. The cellular telephone encapsulates the digital data into a payload of a data packet if a telephone call is underway between the cellular telephone and a device coupled to a public-switched telephone network. On the other hand, the cellular telephone generates an Internet Protocol (IP) packet that carries the digital data and encapsulates the IP packet into the payload of the data packet if a telephone call is underway between the cellular telephone and an Internet telephony device coupled to a communication network. The cellular telephone transmits the data packet to a base station such that if the payload contains the IP packet the base station extracts the IP packet from the payload and transfers the IP packet over the communication network and if the payload contains only the digital data the base station recovers the voice signal from the digital data and transfers the voice signal via a public-switched telephone network.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which.

DETAILED DESCRIPTION OF THE PREFERRED EMBODIMENTS

Figure 1:
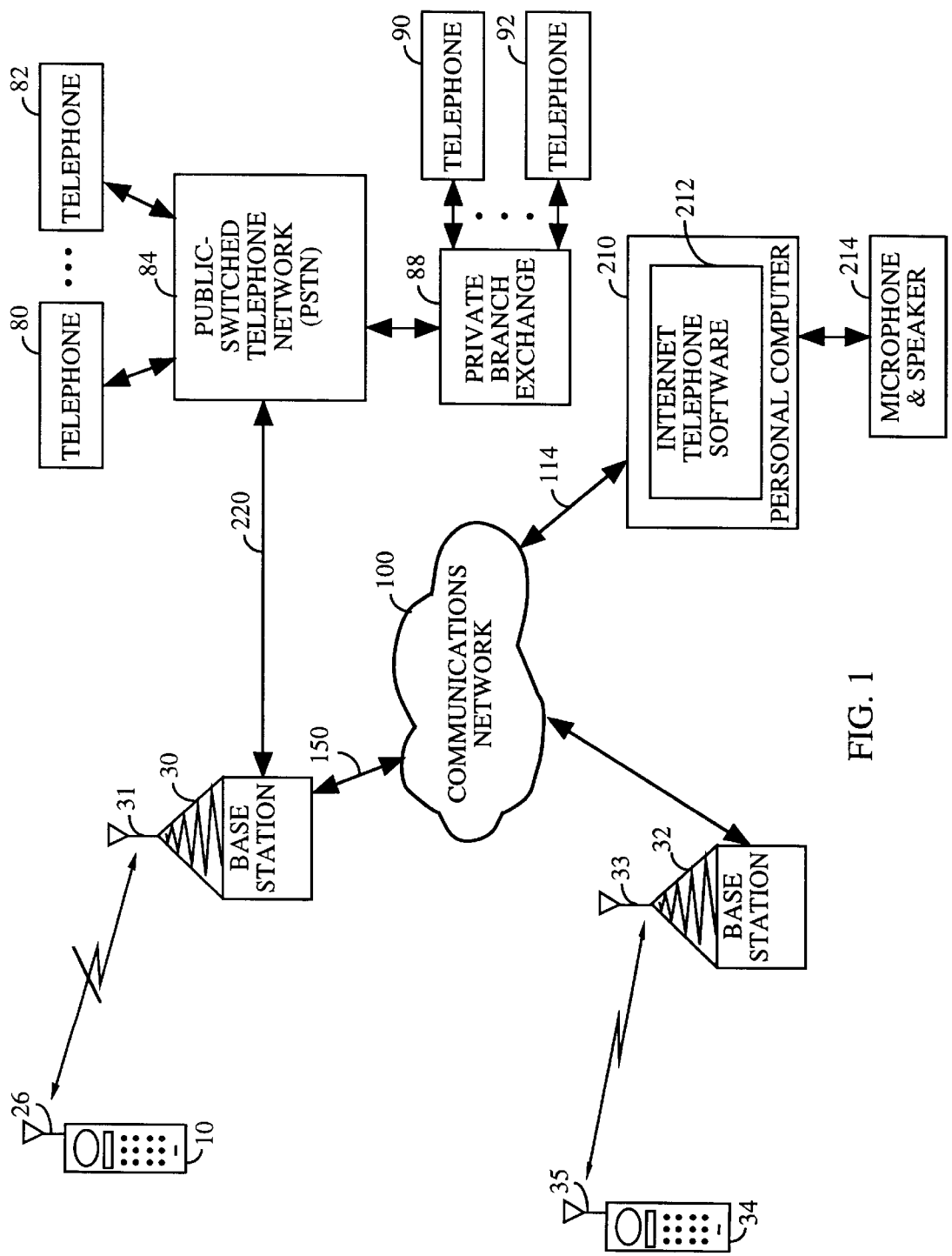
FIG. 1 shows a cellular telephone that includes the capability of performing Internet telephone calls with devices coupled to a communication network.

FIG. 1 shows a cellular telephone 10 that includes the capability of performing telephone calls with devices coupled to a public-switched telephone network (PSTN) 84 and that includes the capability of performing Internet telephone calls with devices coupled to a communication network 100. The cellular telephone 10 is a registered mobile station of communication services provided by a base station 30. The base station 30 provides a voice call service and a data call service. The cellular telephone 10 uses the voice call service to call devices coupled to the PSTN 84 and uses the data call service to perform Internet calls via the communication network 100.

The base station 30 communicates with mobile stations including the cellular telephone 10 by exchanging data packets according to a predetermined digital communication protocol. Data packets are transferred in a forward direction from the base station 30 to the cellular telephone 10 and in a reverse direction from the cellular telephone 10 to the base station 30. In one embodiment, the cellular telephone 10 communicates with the base station 30 using a code division multiple access (CDMA) cellular communication protocol. The CDMA protocol enables transfer of digital data via the antennas 26 and 31 at data rates of approximately 8 and 13 kilobits per second per channel.

Figure 2A:
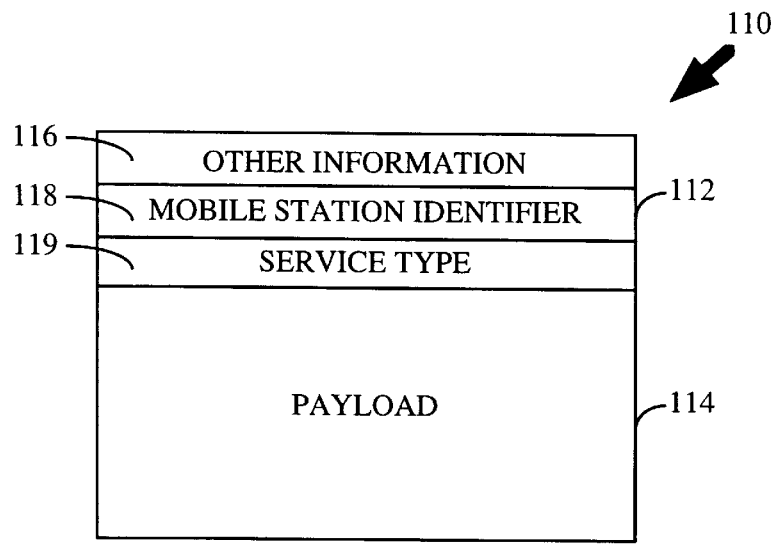
FIGS. 2a–2c illustrate the data packets exchanged by the base station and the cellular telephone.
Figure 2B:
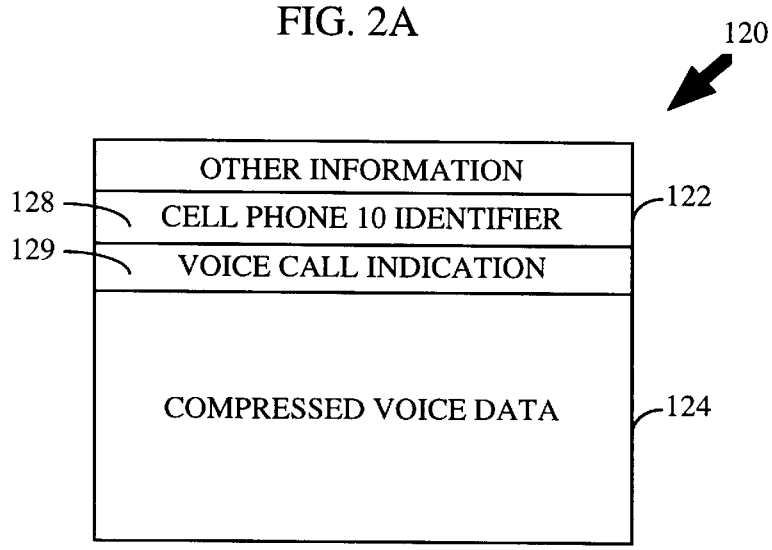
Figure 2C:
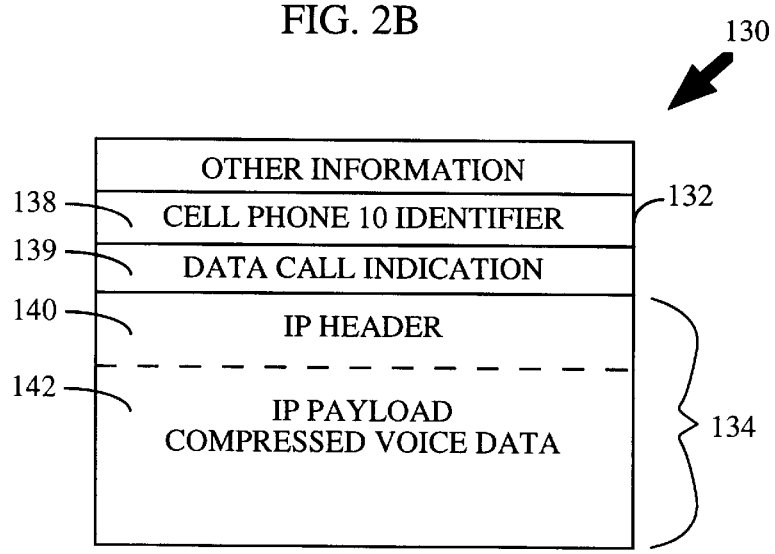

The cellular telephone 10 generates data packets for transmission to the base station 30 in the reverse direction and consumes digital data packets received from the base station 30 in the forward direction. FIGS. 2a–2c illustrate the data packets exchanged by the base station 30 and the cellular telephone 10.

FIG. 2a shows the general format of a data packet 110. The data packet 110 includes a header 112 and a payload 114. The header 112 includes a mobile station identifier field 118 that specifies a mobile station such as the cellular telephone 10 that is either the source or the destination of the data packet 110. The header 112 also includes a service type field 119 that specifies either the data call service or the voice call service of the base station 30. An other information field 116 accommodates other header information associated with the data packet 110. The payload 114 contains the data associated with the data packet 110 the contents of which depend upon whether or not an Internet call is underway as distinguished by the service type indication in the service type field 119.

The data packets generated and consumed by the cellular telephone 10 with respect to telephone calls with a device coupled to the PSTN 84 are referred to as voice-call data packets. FIG. 2b illustrates a voice-call data packet 120. The voice-call data packet 120 includes a header 122 and a payload 124. The header 122 includes a mobile station identifier field 128 and a service type field 129. The mobile station identifier field 128 contains an identifier associated with the cellular telephone 10 (cell phone 10 identifier). In one embodiment, the cell phone 10 identifier is a unique hardware identifier for the cellular telephone 10 which is provided at the time of manufacture. The service type field 129 contains a predetermined voice call indication. The payload 124 for the voice-call data packet 120 contains compressed voice data associated with a telephone call underway between the cellular telephone 10 and a device coupled to the PSTN 84.

The data packets generated and consumed by the cellular telephone 10 with respect to the Internet telephone calls with a device coupled to the communication network 100 are referred to as Internet-call data packets. FIG. 2c shows an Internet-call data packet 130. The Internet-call data packet 130 includes a header 132 and a payload 134. The header 132 includes a mobile station identifier field 138 and a service type field 139. The mobile station identifier field 138 contains the cell phone 10 identifier and the service type field 139 contains a predetermined data call indication.

The payload 134 of the Internet-call data packet 130 contains a data packet formatted according the Internet communication protocols, hereinafter referred to as an IP packet. The IP packet carried by the payload 134 includes an IP header 140 and an IP payload 142. The IP payload 142 carries the compressed voice data associated with a telephone call underway between the cellular telephone 10 and a device coupled to the communication network 100. The contents of the IP header 140 depends upon the particular Internet protocol being employed, for example TCP/IP or UDP/IP.

In another embodiment, the IP header 140 is not carried in the Internet-call data packets exchanged between the cellular telephone 10 and the base station 30 but is instead inserted into the IP packets and stripped from IP packets by the base station 30 before and after transfer of the IP packets over the communication network 100. This embodiment, reduces communication overhead on the cellular communication channel between the base station 30 and the cellular telephone 10.

At the start of a given call, the base station 30 and the cellular telephone 10 negotiate whether the given call is to be conducted using the data call service or the voice call service. The base station 30 transfers a paging message to the cellular telephone 10 in response to telephone calls that originate from either the PSTN 84 or the communication network 100. A paging message from the base station 30 specifies the data call service in response to Internet telephone calls that originate on the communication network 100. A paging message from the base station 30 specifies the voice call service in response to telephone calls that originate on the PSTN 84.

The cellular telephone 10 generates an origination message in response to initiation of a telephone call by the user of the cellular telephone 10. The origination message specifies either the data call service or the voice call service. The origination message specifies the data call service in response to entry or selection of an IP address by the user of the cellular telephone 10. The origination message specifies the voice call service in response to entry or selection of telephone number by the user of the cellular telephone 10.

The cellular telephone 10 includes the capability for storing IP addresses which are used for Internet telephone calls conducted via the communication network 100. The cellular telephone 10 enables a user to enter the IP addresses, select stored IP address, and enter and select telephone numbers for voice calls conducted via the PSTN 84. The cellular telephone 10 includes a display capability that enables information and status display to the user of the cellular telephone 10 including stored telephone numbers and stored IP addresses.

The user of the cellular telephone 10 enters an IP address for the cellular telephone 10 as well as IP addresses of destination Internet telephony devices which are accessible the communication network 100. The accessible destination Internet telephony devices in the example shown in FIG. 1 include a personal computer 210 that executes Internet telephone software 212 and that includes Internet access hardware and software. The Internet telephone software 212 includes software routines for decompressing the compressed voice data carried by IP packets that originate in the cellular telephone 10 and which are carried between the cellular telephone 10 and the base station 30 within the payload of Internet-call data packets.

The base station 30 implements Internet communication protocols for carrying the IP packets over the communication network 100 via a communication link 150. In one embodiment, the network layer protocol in the base station 30 is the User Datagram Protocol/Internet Protocol (UDP/IP) standard for Internet communication. In another embodiment, the network layer protocol in the base station 30 is the Transmission Control Protocol/Internet Protocol (TCP/IP) standard for Internet. Each of these IP protocols identifies the the cellular telephone 10 and the personal computer 210 and other Internet telephony devices with respective IP addresses. The UDP/IP protocol is less reliable than TCP/IP but may be preferable for Internet voice calls which can tolerate some loss during transfers via the communication network 100 but which cannot tolerate the delay associated with the TCP/IP protocol.

The base station 30 in one embodiment contains a host table that includes IP address entries for communication devices accessible via the communication network 100 including the cellular telephone 10 and the personal computer 210. In another embodiment, the base station 30 utilizes a Domain Name Server (DNS) facility available on the communication network 100 to acquire IP addressing information for the devices on the communication network 100.

The base station 30 relays the Internet-call data packets received from the cellular telephone 10 in the reverse direction onto the appropriate destination on the communication network 100 according to the UDP/IP or TCP/IP communication protocols. In addition, the base station 30 relays the IP packets received from via the communication network 100 according to the UDP/IP or TCP/IP communication protocols onto the cellular telephone 10 in the forward direction using payloads of the Internet-call data packets to transport the IP packets.

In contrast, the base station 30 recovers voice signals from the voice-call data packets received from the cellular telephone 10 in the reverse direction and transfers the recovered voice signals to the PSTN 84 according to communication protocol of a communication link 220. In addition, the base station 30 receives voice signals from the PSTN 84 via the communication link 220, samples and compresses the received voice signals, and relays the compressed voice data onto the cellular telephone 10 in the forward direction using payloads of voice-call data packets to transport the compressed voice data.

The PSTN 84 provides communication to a variety of telephony devices including a set of telephones 80–82, and a set of telephones 90–92 coupled to a private branch exchange (PBX) 88. In one embodiment, the communication link 220 is a T1 communication link.

The personal computer 210 includes Internet telephone software 212. The Internet telephone software 212 enables voice communication with other Internet telephony capable equipment via the communication network 100. The Internet telephone software 212 in one embodiment includes a speech compression/decompression function. The speech compression/decompression function is also referred to as a vocoder function. The personal computer 210 includes a microphone and speaker subsystem 214 for use in conjunction with the Internet telephone software 212.

The cellular telephone 10 may also perform Internet telephone calls with a cellular telephone 34 having similar capability through a base station 32 having similar capability to that of the base station 30. The base station 32 provides the data call service via the antennas 33 and 35 and provides network layer protocols for Internet communication via the communication network 100. The cellular telephone 34 includes Internet telephone functionality including entry and storage of IP addresses.

Figure 3:
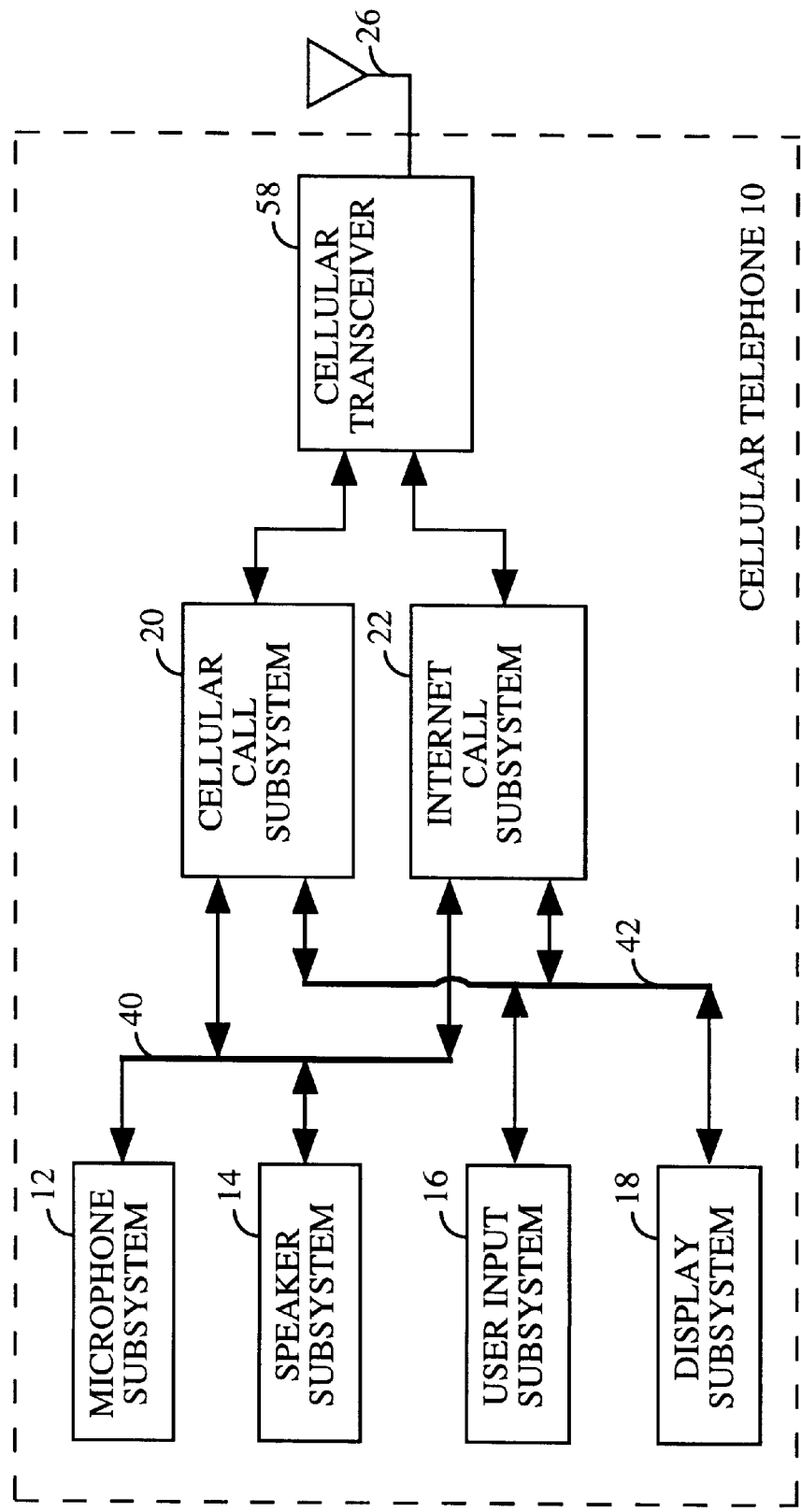
FIG. 3 illustrates one embodiment of a cellular telephone according to the present techniques.

FIG. 3 illustrates one embodiment of the cellular telephone 10. The cellular telephone 10 includes a cellular call subsystem 20, an Internet call subsystem 22, and a cellular transceiver 58. The cellular transceiver 58 enables digital cellular radio communication via the antenna 26. The cellular telephone 10 also includes a microphone subsystem 12, a speaker subsystem 14, a user input subsystem 16, and a display subsystem 18.

The cellular call subsystem 20 conducts calls with telephony devices coupled to the PSTN 84 by generating and consuming voice-call data packets that carry compressed voice data. The cellular call subsystem 20 generates origination messages that specify the voice call service of the base station 30 in response to user selection or entry of telephone numbers using the user input subsystem 16. The cellular call subsystem 20 handles paging messages from the base station 30 that specify the voice call service for telephone calls that originate from the PSTN 84.

The Internet call subsystem 22 conducts calls with Internet telephony devices coupled to the PSTN 84, such as the personal computer 210, using Internet-call data packets. The Internet call subsystem 22 generates origination messages that specify the data call service of the base station 30 in response to user selection or entry of IP addresses using the user input subsystem 16 and handles paging messages from the base station 30 that specify the data call service for Internet telephone calls that originate on the communication network 100.

The Internet call subsystem 22 includes a persistent memory for storing an IP address that corresponds to the cellular telephone 10 as well as IP addresses for destination Internet telephone devices. The Internet call subsystem 22 may share the persistent memory with the cellular call subsystem 20 for storing IP addresses and telephone numbers as well as related information.

The user input subsystem 16 enables a user to enter telephone numbers and select stored telephone numbers for use by the cellular call subsystem 20 and enables a user to enter and select IP addresses for use by the Internet call subsystem 22. The user input subsystem 16 enables entry of an IP address for the cellular telephone 10 as well as IP addresses of destination Internet telephony devices used in two-way Internet telephone calls. In one embodiment, the user input subsystem 16 is a touch entry keypad. The display subsystem 18 provides information and status displays to the user including stored telephone numbers and stored IP addresses.

While an Internet telephone call is underway, the microphone subsystem 12 senses audio input and converts the audio input into electrical signals for use by the Internet call subsystem 22. The Internet call subsystem 22 converts the audio electrical signals from the microphone subsystem 12 into digital audio samples, compresses the digital audio samples according to a predetermined vocoder function, and assembles the compressed digital audio samples into Internet-call data packets for transmission by the cellular transceiver 58 in the reverse direction. Internet-call data packets received by the cellular transceiver 58 in the forward direction are transferred to the Internet call subsystem 22. The Internet call subsystem 22 extracts and decompresses the digital audio samples contained within the payloads of incoming Internet-call data packets and provides the audio samples to the speaker subsystem 14 for rendering to the user.

While a normal telephone call is underway, the cellular call subsystem 20 converts the audio electrical signals sensed by the microphone subsystem 12 into compressed digital audio samples according to the predetermined vocoder function and assembles the compressed digital audio samples into voice-call data packets for transmission by the cellular transceiver 58 in the reverse direction. The incoming voice-call data packets received by the cellular transceiver 58 in the forward direction are transferred to the cellular call subsystem 20. The cellular call subsystem 20 extracts and decompresses the digital audio samples contained in the payloads of incoming voice-call data packets and provides the audio samples to the speaker subsystem 14 for rendering to the user.

Figure 4:
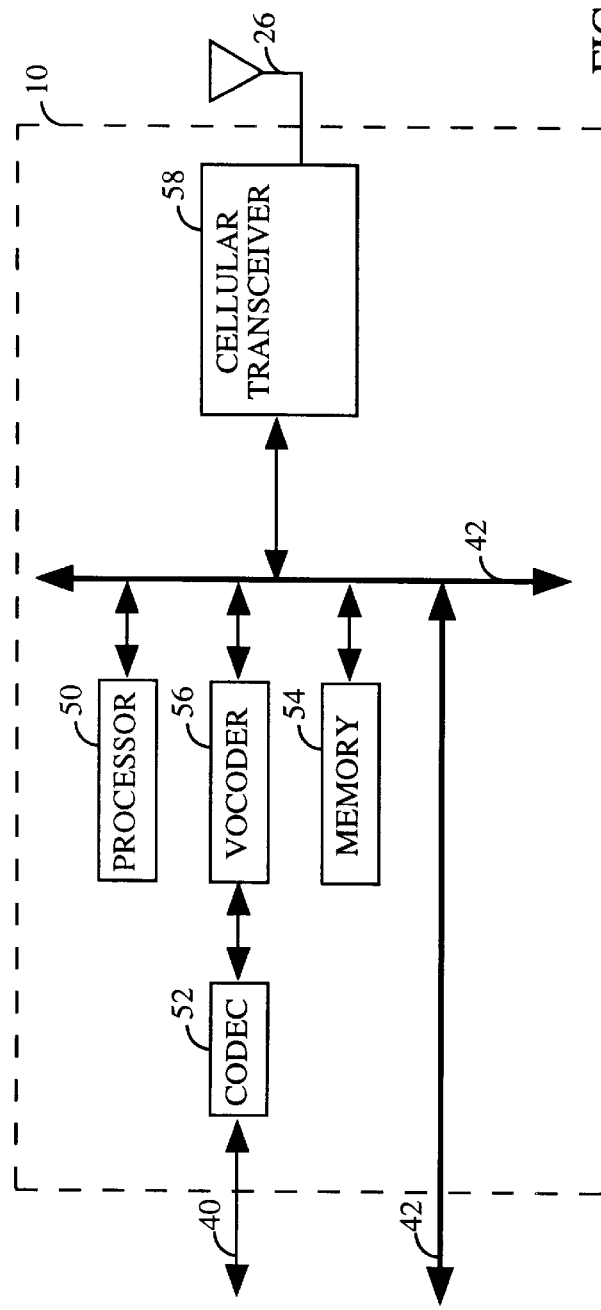
FIG. 4 shows a hardware implementation of the cellular call and Internet call subsystems of the cellular telephone.

FIG. 4 shows a hardware implementation of the cellular call and Internet call subsystems 20–22 of the cellular telephone 10. The cellular call subsystem 20, as well as the Internet call subsystem 22, is realized by a processor 50, a codec 52, a memory 54, and a vocoder 56. In one embodiment, the differing functionalities of the cellular call and Internet call subsystems 20 and 22 are realized by differing software elements executed by the processor 50. The software elements are contained in the memory 54 which is a persistent memory.

The codec 52 provides an interface to the microphone subsystem 12 and the speaker subsystem 14. via a signal path 40. The codec 52 performs analog-to-digital and digital-to-analog conversion functions for both the cellular and Internet call subsystems 20 and 22.

The vocoder 56 performs speech compression and decompression functions for both the cellular and Internet call subsystems 20 and 22. In one embodiment, the vocoder 56 performs compression and decompression of digital data samples according to the CDMA protocol and provides compressed data rates of 8 Kbits/sec and 13 Kbits/second for use with both the data and voice call services.

The processor 50 obtains compressed digital audio samples from the vocoder 56 via a processor bus 42, assembles the compressed digital audio samples into data packets having the format of the data packets 120 and 130 and feeds the assembled data packets to the cellular transceiver 58 via the processor bus 42 The processor 50 receives incoming data packets from the cellular transceiver 58 via the processor bus 42 and feeds digital audio samples contained therein to the vocoder 56 via the processor bus 42.

Figure 5:
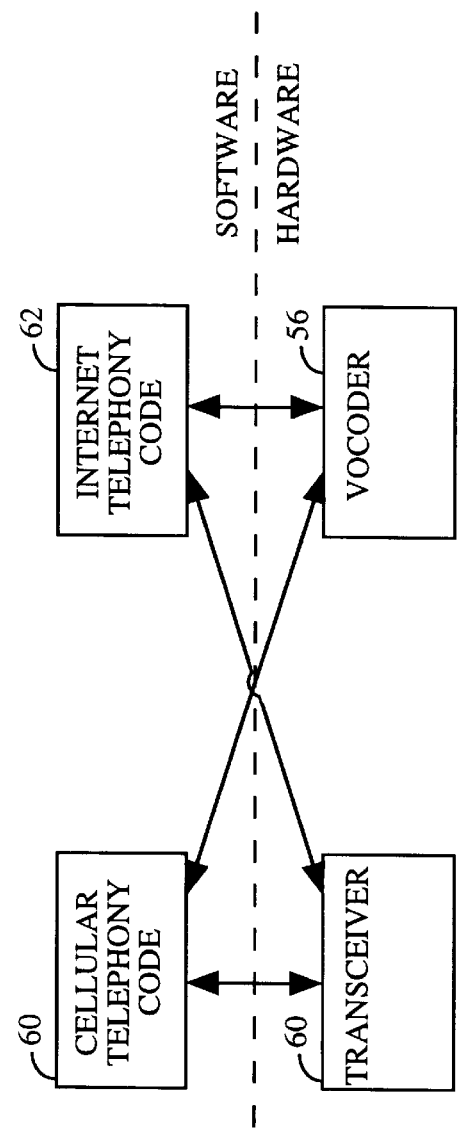
FIG. 5 illustrates the software elements of the cellular telephone in one embodiment.

FIG. 5 illustrates the software elements of the cellular telephone 10 in one embodiment. The software elements includes cellular telephony code 60 that provides the functionality of the cellular call subsystem 20 and Internet telephony code 62 that provides the functionality of the Internet call subsystem 22. The Internet telephony code 62 may be added to an existing cellular telephone 10 to provide Internet telephone functionality without requiring hardware upgrades to the cellular telephone 10.

The Internet telephony code 62 includes code for obtaining compressed audio data samples from the vocoder 56, code for assembling the compressed audio data samples into outbound Internet-call data packets, and code for providing the outbound Internet-call data packets to the cellular transceiver 58. The Internet telephony code 62 also includes code for obtaining inbound Internet-call data packets from the cellular transceiver 58 and code for extracting the compressed audio samples contained in the IP packets carried by the payloads of inbound Internet-call data packets and code for providing the extracted compressed audio samples to the vocoder 56.

The Internet telephony code 62 also includes code for negotiating connections to the base station 30 using the data call service. The Internet telephony code 62 generates an origination message that requests the data call service in response to user selection or entry of an IP address via the user input subsystem 16. The Internet telephony code 62 provides the origination message to the cellular transceiver 58 for transmission to the base station 30. In addition, the Internet telephony code 62 includes code for handling paging messages from the base station 30 that request a data call service connection.

The cellular telephony code 60 includes code for obtaining compressed audio data samples from the vocoder 56, code for assembling the compressed audio data samples into outbound voice-call data packets, and code for providing the outbound voice-call data packets to the cellular transceiver 58. The cellular telephony code 60 also includes code for obtaining inbound voice-call data packets from the cellular transceiver 58 and code for providing the compressed audio samples contained in the payloads of the inbound voice-call data packets to the vocoder 56.

The cellular telephony code 60 includes code for negotiating connections to the base station 30 using the voice call service. The cellular telephony code 60 generates an origination message that requests the voice call service in response to user selection or entry of a telephone number via the user input subsystem 16. The cellular telephony code 60 provides the origination message to the cellular transceiver 58 for transmission to the base station 30. In addition, the cellular telephony code 60 includes code for handling paging messages from the base station 30 that request a voice call service connection.

Figure 6:
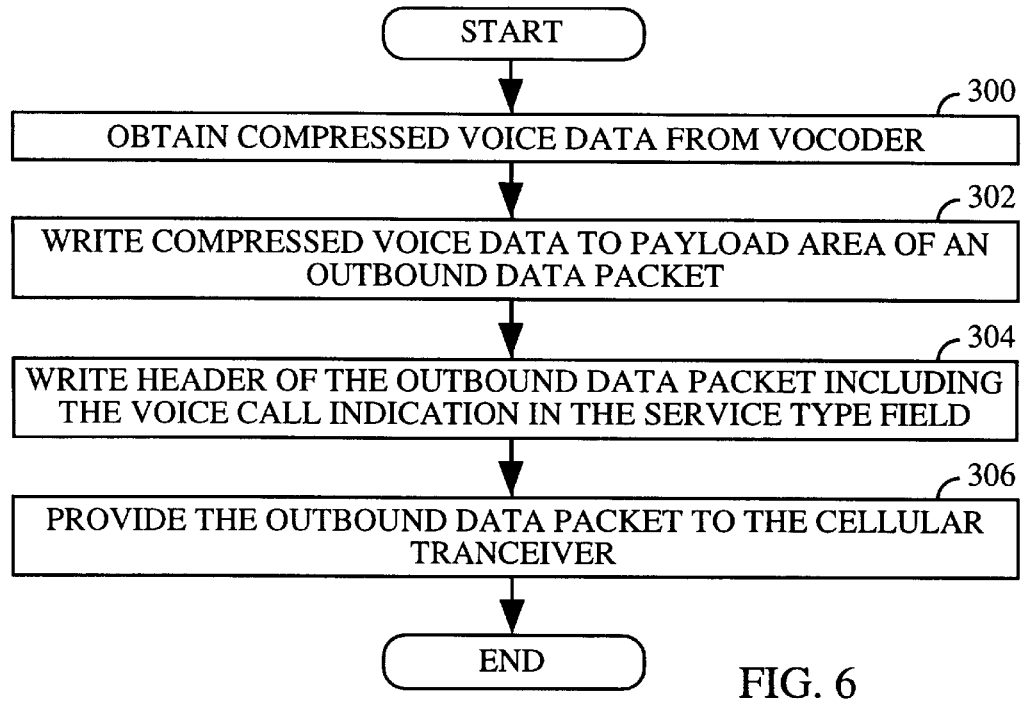
FIG. 6 illustrates the handling of an outbound voice-call data packet by the cellular telephony code.

FIG. 6 illustrates the handling of outbound data for a voice call by the cellular telephony code 60. The cellular telephony code 60 generates an outbound voice-call data packet in accordance with the format of the voice-call data packet 120 to carry the outbound voice call data. At step 300, the cellular telephony code 60 obtains compressed voice data from the vocoder 56. At step 302, the cellular telephony code 60 writes the obtained compressed voice data to the payload 124 of the voice-call data packet 120. At step 304, the cellular telephony code 60 writes the header 122 of the voice-call data packet 120 including the voice call indication into service type field 129. At step 306, the cellular telephony code 60 feeds the voice-call data packet 120 to the cellular transceiver 58 for transmission as an outbound data packet in the reverse direction.

Figure 7:
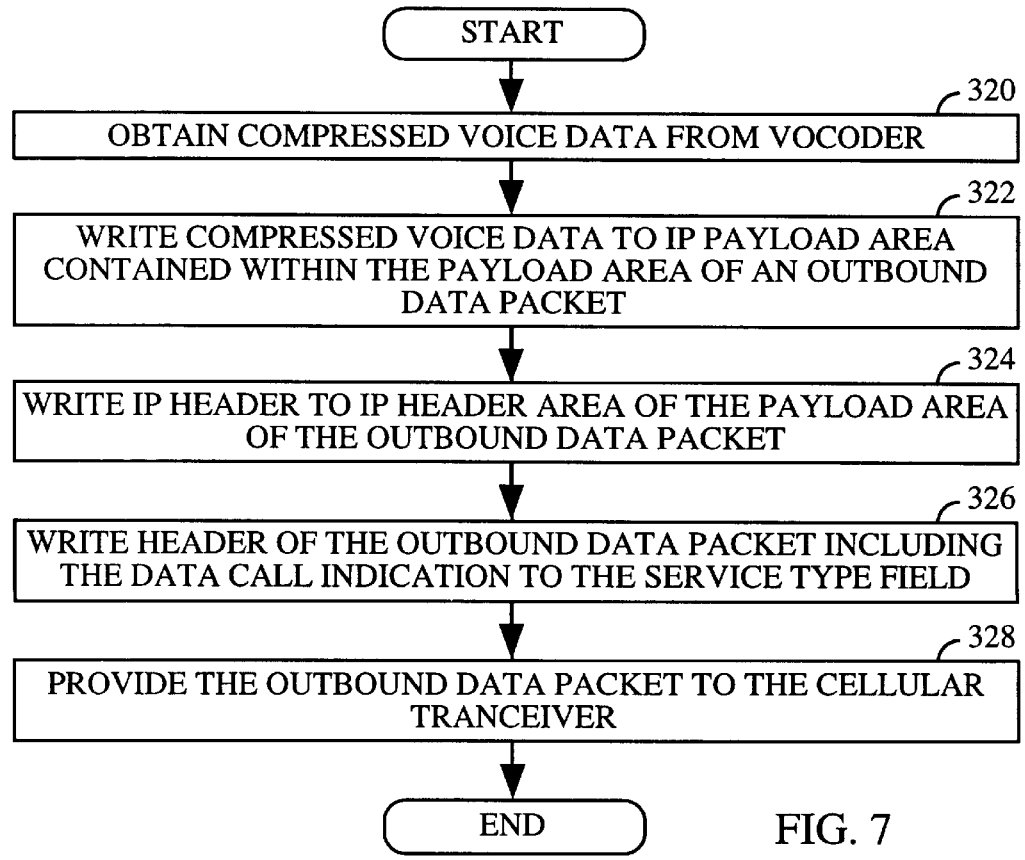
FIG. 7 illustrates the handling of an outbound Internet-call data packet by the Internet telephony code.

FIG. 7 illustrates the handling of outbound data for an Internet call by the Internet telephony code 62 which generates an Internet-call data packet in accordance with the format of the Internet-call data packet 130. At step 320, the Internet telephony code 62 obtains compressed voice data from the vocoder 56. At step 322, the Internet telephony code 62 writes the obtained compressed voice data to the IP payload 142 contained within in the payload 134 of the Internet-call data packet 130.

At step 324, the Internet telephony code 62 writes the IP header 140 within the payload 134 of the Internet-call data packet 130. In one embodiment, the IP header 140 includes IP addresses for the cellular telephone 10 and the destination device on the communication network 100. In another embodiment, these IP address are inserted into the IP header 140 by the base station 30 before the IP packet contained in the payload 134 of the Internet-call data packet 130 is relayed over the communication network 100.

At step 326, the Internet telephony code 62 writes the header 132 of the Internet-call data packet 130 including the data call indication into service type field 139 of the Internet-call data packet 130. At step 328, the Internet telephony code 62 feeds the Internet-call data packet 130 to the cellular transceiver 58 for transmission as an outbound data packet in the reverse direction.

Figure 8:
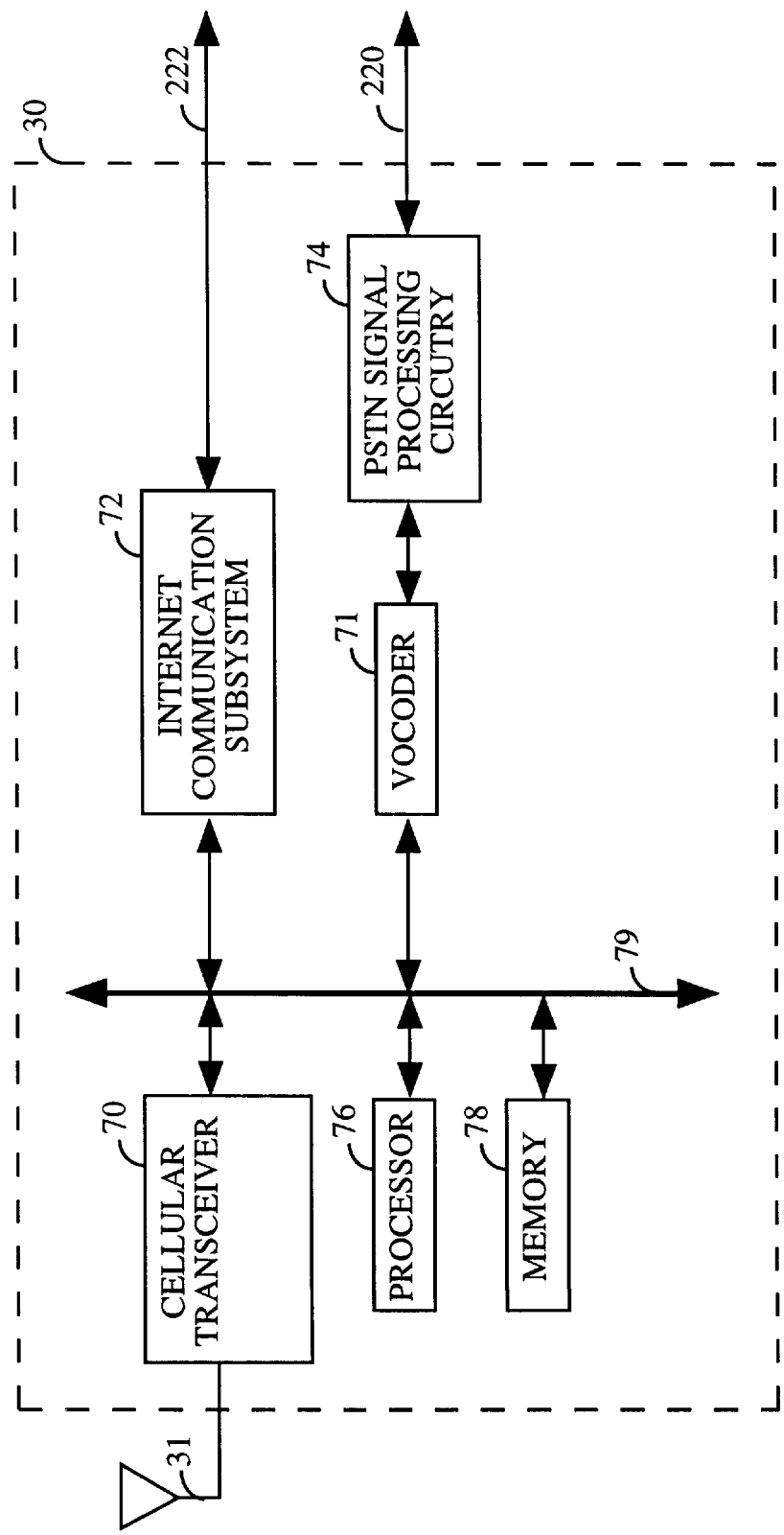
FIG. 8 illustrates the base station 30 in one embodiment.

FIG. 8 illustrates the base station 30 in one embodiment. The base station 30 includes a processor 76, a memory 78, a cellular transceiver 70, a vocoder 71, an Internet communication subsystem 72, and PSTN signal processing circuitry 74. The cellular transceiver 70 enables over the air digital communication via the antenna 31.

The processor 76 maintains a data base of registered mobile users in the memory 78. The data base of registered mobile users includes an entry for each mobile station, such as the cellular telephone 10, supported by the base station 30. The entry in the data base for the cellular telephone 10 includes a unique hardware identifier for the cellular telephone 10 and a telephone number and an IP address which is associated with the cellular telephone 10.

The processor 76 obtains voice-call and Internet-call data packets in the reverse direction from the cellular telephone 10 through the cellular transceiver 70. The processor 76 feeds the payload of the voice-call data packets from the cellular telephone 10 to the vocoder 71. On the other hand, the processor 76 feeds the payload of the Internet-call data packets from the cellular telephone 10 to the Internet communication subsystem 72.

The vocoder 71 recovers speech signals from the payload of the voice-call data packets by performing an inverse of the speech compression function which was performed by the vocoder 56 contained in the cellular telephone 10. The recovered speech signals from the vocoder 71 are then provided to the PSTN signal processing circuitry 74 which conditions the speech signals for transmission via the PSTN 84.

The Internet communication subsystem 72 relays the IP packets contained in the payloads of Internet-call data packets received from the cellular telephone 10 to the appropriate destination via the communication network 100 according to Internet communication protocols. The appropriate destination on the communication network 100 is specified an IP address for the destination which is contained in the IP header of the IP packets. The IP address of the destination in one embodiment is placed in the IP header by the cellular telephone 10. In another embodiment, the processor 76 uses the mobile station identifier contained in the Internet-call data packets to access the IP address for the destination from the data base contained in the memory 78.

The processor 76 obtains IP packets that originate on the communication network 100 from the Internet communication subsystem 72 and then reads the IP address contained therein. The processor 76 uses the IP address in the IP packets to obtain the hardware identifier for the cellular telephone 10 from the data base contained in the memory 78. The processor 76 encapsulates the IP packet into the payload of an Internet-call data packet and feeds the Internet-call data packet to the transceiver 70 for transmission to the cellular telephone 10 in the forward direction.

The processor 76 obtains compressed digital samples of audio that originates on the PSTN 84 from the vocoder 71. The processor 76 encapsulates the digital samples into a voice-call data packet and feeds the voice-call data packets to the transceiver 70 for transmission to the cellular telephone 10 in the forward direction.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A cellular telephone, comprising:

means for generating a set of digital data representing a voice signal from a user of the cellular telephone;

means for encapsulating the digital data into a payload of a data packet if a telephone call is underway between the cellular telephone and a device coupled to a public-switched telephone network;

means for generating an Internet Protocol (IP) packet that carries the digital data and means for encapsulating the IP packet into the payload of the data packet if a telephone call is underway between the cellular telephone and an Internet telephony device coupled to a communication network;

means for transmitting the data packet to a base station such that if the payload contains the IP packet the base station extracts the IP packet from the payload and transfers the IP packet over the communication network and if the payload contains only the digital data the base station recovers the voice signal from the digital data and transfers the voice signal via the public-switched telephone network.

2. The cellular telephone of claim 1, wherein the data packet includes a header that specifies a voice call service of the base station if the payload contains only the digital data representing the voice signal.

3. The cellular telephone of claim 2, further comprising means for generating an origination message that requests the voice call service and for transmitting the origination message to the base station in response to a selection of a telephone number by the user for the device coupled to the public-switched telephone network.

4. The cellular telephone of claim 1, wherein the data packet includes a header that specifies a data call service of the base station if the payload contains the IP packet which contains the digital data representing the voice signal.

5. The cellular telephone of claim 4, further comprising means for generating an origination message that requests the data call service and for transmitting the origination message to the base station in response to a selection of an IP address by the user for the device coupled to the communication network.

6. The cellular telephone of claim 1, wherein the IP packet contained in the payload of the data packet includes an IP header that specifies an IP address for the cellular telephone and an IP address for the device coupled to the communication network.

7. The cellular telephone of claim 1, wherein the IP packet contained in the payload of the data packet includes an IP header that specifies an IP address for the device coupled to the communication network such that the base station inserts an IP address for the cellular telephone into the IP header before transferring the IP packet over the communication network.

8. The cellular telephone of claim 1, wherein the IP packet is transferred over the communication network according to a User Datagram Protocol/Internet Protocol.

9. A method for operating a cellular telephone, comprising the steps of:

generating a set of digital data representing a voice signal from a user of the cellular telephone;

encapsulating the digital data into a payload of a data packet yielding encapsulated data if a telephone call is underway between the cellular telephone and a device coupled to a public-switched telephone network;

generating an Internet Protocol (IP) packet that carries the digital data and encapsulated data if a telephone call is underway between the cellular telephone and an Internet telephony device coupled to a communication network; and transmitting the data packet to a base station such that if the payload contains the IP packet the base station extracts the IP packet from the payload and transfers the IP packet over the communication network and if the payload contains only the digital data the base station recovers the voice signal from the digital data and transfers the voice signal via the public-switched telephone network.

10. The cellular telephone of claim 9, wherein the data packet includes a header that specifies a voice call service of the base station if the payload contains only the digital data representing the voice signal.

* * * * *

UNITED STATES PATENT AND TRADEMARK OFFICE
CERTIFICATE OF CORRECTION

PATENT NO. : 5,953,322
DATED : September 14, 1999
INVENTOR(S) : Robert Kimball

It is certified that error appears in the above-identified patent and that said Letters Patent is hereby corrected as shown below:

Column 3,
Line 17, delete "payload" insert -- compressed voice data --.
Line 17, delete "mobile station" insert -- cell phone 10 --.
Line 18, delete "service type" insert -- voice call indication --.
Lines 18-19, delete "mobile station" insert -- cell phone 10 --.
Line 23, delete "service type" insert -- voice call indication --.
Line 25, delete "payload" insert -- compressed voice data --.
Line 34, delete "payload" insert -- IP Header/IP payload compressed voice data --.
Line 36, delete "mobile station" insert -- cell phone 10 --.
Line 37, delete "service type" insert -- data call indication --.
Line 37, delete "mobile station" insert -- cell phone 10 --.

Column 4,
Line 27, after accessible, insert -- to --.

Column 6,
Line 62, delete "." after "14".

Column 8,
Line 36, delete "service type" insert -- data call indication --.

Column 9,
Line 11, before "an", insert -- as --.

Signed and Sealed this

Ninth Day of October, 2001

Attest:

NICHOLAS P. GODICI
*Attesting Officer*   *Acting Director of the United States Patent and Trademark Office*